US010683193B2

(12) United States Patent
Liu et al.

(10) Patent No.: US 10,683,193 B2
(45) Date of Patent: Jun. 16, 2020

(54) FLOOR COVER ARRANGEMENT FOR COVERING AN UNDERFLOOR SPACE OF A PASSENGER CONVEYOR

(71) Applicant: INVENTIO AG, Hergiswil (CH)

(72) Inventors: Lisa Liu, Shanghai (CN); Thomas Novacek, Schwechat (AT); Bill Xu, Shanghai (CN); Cui Yao, Shanghai (CN)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 16/478,383

(22) PCT Filed: Jan. 9, 2018

(86) PCT No.: PCT/EP2018/050408
§ 371 (c)(1),
(2) Date: Jul. 16, 2019

(87) PCT Pub. No.: WO2018/134078
PCT Pub. Date: Jul. 26, 2018

(65) Prior Publication Data

US 2019/0367332 A1 Dec. 5, 2019

(30) Foreign Application Priority Data

Jan. 17, 2017 (EP) .................................... 17151824

(51) Int. Cl.
*B23B 29/00* (2006.01)
*B23B 29/06* (2006.01)
(Continued)

(52) U.S. Cl.
CPC .................................... *B66B 23/00* (2013.01)

(58) Field of Classification Search
CPC .......... B66B 23/00; B66B 29/06; B66B 29/08
(Continued)

(56) References Cited

U.S. PATENT DOCUMENTS 4,126,218 A * 11/1978 El Taher ................. B66B 29/06 198/325
5,372,231 A * 12/1994 Volkening ............... B66B 23/00 198/325
(Continued)

FOREIGN PATENT DOCUMENTS

CN 204643520 U 9/2005
EP 0 885 832 12/1998
(Continued)

OTHER PUBLICATIONS

International Search Report for International Application No. PCT/EP2018/050408 dated Mar. 26, 2018.

*Primary Examiner* — Douglas A Hess
(74) *Attorney, Agent, or Firm* — Knobbe Martens Olson & Bear LLP

(57) ABSTRACT

A floor cover arrangement for covering an underfloor space of a passenger conveyor includes a plurality of cover plates configured to be installed such that the they adjoin each other in a sequence along a longitudinal direction of the underfloor space and form a walking surface covering the underfloor space; a frame comprising a frame rail extending underneath the multiplicity of cover plates in the longitudinal direction; and a plurality of connectors, each connector being configured for fixedly connecting one of the cover plates with the frame. Each connector cooperates with the frame rail such that the connector is displaceable in the longitudinal direction and is fixed in both directions orthogonal to the longitudinal direction, and when arranged at a fixation location associated to one of the cover plates, cooperates with the associated cover plate in a form-fitting manner such that the cover plate is fixed in a direction orthogonal to the walking surface.

15 Claims, 8 Drawing Sheets

(51) Int. Cl.
*B23B 29/08* (2006.01)
*B66B 23/00* (2006.01)

(58) Field of Classification Search
USPC .................................................. 198/324, 325
See application file for complete search history.

(56) References Cited

U.S. PATENT DOCUMENTS

| | | | | |
|---|---|---|---|---|
| 5,628,391 | A * | 5/1997 | Volkening | B66B 23/00 198/325 |
| 6,142,286 | A | 11/2000 | Ulrich et al. | |
| 6,564,904 | B2 * | 5/2003 | Mueller | B05B 16/40 182/222 |
| 7,673,732 | B2 * | 3/2010 | Underberg | B65G 15/42 198/324 |
| 8,424,668 | B2 * | 4/2013 | Gonzalez Alemany | B66B 29/06 198/324 |
| 10,513,420 | B2 * | 12/2019 | Kleewein | B66B 23/08 |

FOREIGN PATENT DOCUMENTS

| | | |
|---|---|---|
| JP | S61 277585 | 12/1986 |
| JP | 2006 103872 | 4/2006 |
| JP | 2008 297056 | 12/2008 |

* cited by examiner a) b)

a)

b)

c)

d)

e)

f)

g)

FLOOR COVER ARRANGEMENT FOR COVERING AN UNDERFLOOR SPACE OF A PASSENGER CONVEYOR

TECHNICAL FIELD

The present disclosure relates to a floor cover arrangement for covering an underfloor space of a passenger conveyor such as an escalator or a moving walkway. Furthermore, the disclosure relates to a passenger conveyor comprising such floor cover arrangement as well as to a method of installing such floor cover arrangement.

SUMMARY

Passenger conveyors such as escalators or moving walkways serve for transporting passengers along an inclined or horizontal transfer path, respectively. At an entry and/or an exit of such passenger conveyor, e.g., longitudinally adjacent to the transfer path, there is typically a so-called underfloor space. Such underfloor space generally houses or accommodates technical components of the passenger conveyor such as its driving unit, its control unit, etc. In order to enable that a passenger may enter or leave the passenger conveyor without problems or risks, the underfloor space is generally covered by a walkable floor cover arrangement.

However, such floor cover arrangement needs to be configured and designed such that it may temporarily be opened or removed in order to enable access to the underfloor space. Accordingly, upon opening or removing the floor cover arrangement, maintenance personnel may access the underfloor space for maintaining the technical components comprised therein.

EP 0 885 832 B1 discloses a floor cover arrangement for a passenger conveyor, the floor cover arrangement being adapted for being temporarily opened. The floor cover arrangement comprises several cover plates arranged in a sequence. Therein, each cover plate may be lifted and may thereby be pivoted relative to neighbouring cover plates.

It has been observed that unintended lifting, opening or tipping-over may occur at the floor cover arrangement or at least one of its cover plates, respectively, in certain situations. Particularly, it has been observed that for example a heel of a shoe of a passenger may get caught or stuck at a profiled surface of the floor cover arrangement or its cover plates. In such situation, the wearer of the shoe may exert substantial forces onto the respective cover plate in an upward direction such that the cover plate may lift, tip-over or even open.

There may be a need for a floor cover arrangement for a passenger conveyor in which unintended lifting, tipping-over or opening of the floor cover arrangement is reliably avoided. Furthermore, there may be a need for a floor cover arrangement which may be easily installed, easily temporarily opened, for example for maintenance purposes, and easily closed again. Furthermore, there may be a need for a passenger conveyor comprising such floor cover arrangement as well as a need for a method for installing such floor cover arrangement easily and reliably.

Such needs may be met by the subject-matter described herein. Advantageous embodiments are defined throughout the following description.

According to a first aspect, a floor cover arrangement for covering an underfloor space of a passenger conveyor such as an escalator or a moving walkway is proposed. The floor cover arrangement comprises a multiple number of cover plates, a frame and a multiple number of connectors. The cover plates are configured to be correctly installed such that the cover plates adjoin each other in a sequence along a longitudinal direction of the underfloor space and the cover plates form a walking surface covering the underfloor space. The frame comprises one or more frame rails extending underneath the multiplicity of cover plates in a longitudinal direction. Each connector is configured for fixedly connecting one of the cover plates with the frame. Therein, the cover plates, the frame and the connectors are configured such that each connector cooperates with one frame rail in a form-fitting manner such that the connector is displaceable in the longitudinal direction and is fixed in both directions orthogonal to the longitudinal direction. Furthermore, the cover plates, the frame and the connectors are configured such that each connector, when arranged at a fixation location associated to one of the cover plates, cooperates with the associated cover plate in a form-fitting manner such that the cover plate is fixed in a direction orthogonal to the walking surface.

According to a second aspect, a passenger conveyor comprising a floor cover arrangement in accordance with an embodiment of the above first aspect is proposed. According to a third aspect, a method for installing a floor cover arrangement according to an embodiment of the above first aspect is proposed. Therein, the method comprises the following steps, preferably in the indicated order: (a) All of the multiple number of connectors are pre-installed on the frame. (b) The frame is then installed on a truss of the escalator or the moving walkway. (c) A first cover plate is then inserted on the frame and (d) fixed to the frame by moving one of the pre-installed connectors longitudinally to a fixation location associated to the first cover plate and cooperatively engaging the connector with the first cover plate. (e) Then, a next cover plate is inserted on the frame in a manner such as to adjoin the preceding cover plate and (f) the next cover plate is fixed to the frame by moving one of the pre-installed connectors longitudinally to a fixation location associated to this next cover plate and cooperatively engaging the connector with the next cover plate. (g) These method steps (e) and (f) are then repeated until all but a last cover plate are inserted and fixed to the frame. (h) Finally, the last cover plate is inserted on the frame and (i) fixed to the frame.

The embodiments of the present disclosure may be interpreted as being based, inter alia and without limiting the scope of the disclosure, on the following observations and recognitions:

Various approaches have already been presented in the prior art for covering an underfloor space in a passenger conveyor. However, each of such prior approaches showed specific disadvantages.

For example, an underfloor space could be covered by one or more cover plates. Therein, the cover plates could be fixedly attached to a truss of the passenger conveyor or to a frame fixed to such truss. For example, the cover plates could be screwed to the truss or to the frame, respectively, and are therefore stably fixed. However, in such approach, disassembling of the floor cover arrangement and removing one or more cover plates could be laborious and time-consuming.

In another approach, as briefly described above, the floor cover arrangement may comprise multiple cover plates configured in an adjoining sequence and interconnected with each other such that each cover plate forms a segment of the entire floor cover arrangement. Therein, single cover plates may be lifted or pivoted relative to neighbouring cover plates, thereby enabling partially opening the floor cover arrangement in a simple and time-saving manner. In such prior approaches, the multiple cover plates typically rest on a truss or a frame connected to the truss of the passenger conveyor only due to their weight, e.g., due to gravity forces. Accordingly, in cases where excessive forces are applied to a cover plate in an upward direction, due to for example a passenger drawing his shoe in the upward direction while the shoe being caught by the cover plate, the cover plate may be unintendedly lifted or opened.

The floor cover arrangement proposed herein intends to combine the advantages of prior approaches while avoiding their disadvantages. Particularly, the proposed floor cover arrangement is easy to be installed and easy to be temporarily opened while, nevertheless, providing for a safe and reliable fixation of the floor cover arrangement's cover plates to an underlying frame. As explained in detail further below, such beneficial arrangement may be obtained particularly by providing a specific type of connectors for connecting each or at least most of the cover plates in a simple but nevertheless reliable form-fitting manner to the frame.

The floor cover arrangement should comprise a multiple number, e.g., two, preferably three or more, cover plates. Each cover plate may be plate-like, e.g., having a substantially two-dimensional shape with dimensions of the cover plate being substantially larger in their extension plane as compared to a thickness of the cover plate transversal to this extension plane. Each cover plate may form a part of the walking surface with its upper surface such that the multiplicity of cover plates being arranged in a sequence along the longitudinal direction of the underfloor space may form the entire walking surface along which a passenger may enter or exit the transfer path of the passenger conveyor. The upper surface of the cover plates may be profiled. For example, these upper surfaces may comprise neighbouring grooves and intermediate ridges extending for example in a direction transverse to the longitudinal direction of the floor cover arrangement. The cover plates are generally even or planar. Optionally, cover plates may be slightly curved or bent. Therein, each of the cover plates should be sufficiently stable for enabling carrying high loads of for example more than 1,000 N such as to withstand the significant forces exerted by passengers walking over the floor cover arrangement. The cover plates may be made for example with metal, particularly with aluminium, and may be made for example by extrusion or similar manufacturing processes. Typically, each cover plate may have dimensions of 0.5 to 1.5 m in width and 0.2 to 2 m in length.

In an installed configuration of the floor cover arrangement, e.g., when all cover plates are correctly installed at their intended positions on top of the underfloor space, the cover plates adjoin each other in a sequence along the longitudinal direction of the underfloor space. In other words, a first one of the cover plates adjoins a second cover plate neighbouring this first one in the longitudinal direction, a third cover plate adjoins the second cover plate, and so on, up to a last one of the cover plates. Therein, in such combination, the sum of all cover plates forms the walking surface of the floor cover arrangement covering the underfloor space. If all cover plates are correctly installed, such resulting walking surface should generally be substantially even and is typically flush with neighbouring portions of a bottom adjacent to the passenger conveyor and/or to the underfloor space. However, if the cover plates are not correctly installed, at least some of the cover plates could not be even or not be flush with neighbouring portions of the bottom or there could be undesired gaps between neighbouring cover plates. As explained in more detail further below, embodiments of the proposed floor cover arrangement may help avoiding such unintended incorrect installation.

The frame of the floor cover arrangement may serve, inter alia, for fixing the floor cover arrangement to a truss in a building. Such truss may be a load carrying structure within the building which is adapted for carrying the weight of the passenger conveyor and its passengers. The frame may be fixedly installed to such truss such that removing the frame from the truss is impossible or time-consuming. For example, the frame may typically be screwed or riveted to the truss. Generally, the frame may be fixed to the truss at least at its opposing lateral sides. The frame may be made with a metal construction, for example with steel or aluminium.

The frame comprises at least one frame rail. This frame rail extends below the multiplicity of cover plates and is directed in the longitudinal direction of the floor cover arrangement. In other words, the frame rail may preferably extend from the first one to the last one of the cover plates in a region underneath all these cover plates. Therein, while one frame rail might be sufficient, it is typically preferred to provide at least two frame rails, extending for example parallel to each other and being spaced from each other in a direction orthogonal to the longitudinal direction of the floor cover arrangement. Therein, each of the two frame rails may extend close to one of the lateral edges of the frame, thereby possibly extending along one of the lateral edges of the floor cover arrangement.

While the multiplicity of cover plates as well as the frame of the floor cover arrangement proposed herein may be similar or substantially same to the cover plates and frame of conventional floor cover arrangements, the floor cover arrangement described herein significantly differs from such prior art approaches by the specific connectors applied for fixing the cover plates to the frame.

On the one hand, such connectors and the cover plates and the frame are adapted with respect to each other such that each connector may cooperate with one frame rail of the frame in a form-fitting manner Therein, for example a geometry of the connector and the frame rail in cooperating portions of both components should be adapted such that the connector is displaceable in the longitudinal direction, e.g., in a direction along the extension direction of the frame rail, but is fixed in both directions orthogonal to this longitudinal direction. In other words, the connector and the frame rail should cooperate such as to obtain a form-fit in two directions while allowing a free degree of motion in the longitudinal direction being orthogonal to both these directions.

Accordingly, during an installation procedure, each of the cover plates may be inserted into the frame at an intended position and one or more associated ones of the connectors may then be moved in the longitudinal direction up to a predetermined fixation location associated to the respective cover plate.

On the other hand, each connector when arranged at such fixation location associated to a respective one of the cover plates, should be configured for cooperating with the associated cover plate in a form-fitting manner Therein, a geometry or other features of the connector and the associated cover plate should be adapted to each other such as to enable to fix the cover plate in a direction orthogonal to the walking surface. In other words, due to the connector and its specific way of cooperating with its associated cover plate, a form-fit in at least one direction is obtained, e.g., the connector fixes the cover plate at least in a vertical upward direction.

Accordingly, due to the form-fit between the connector and the guide rail, on the one hand, and the form-fit between the connector and the associated cover plate, on the other hand, the cover plate may be fixed to the guide rail via its connectors such as to avoid at least a vertical upwards directed motion of the cover plate. In other words, using the specific connectors, each cover plate may be securely held at the frame and may be prevented from unintendedly being lifted.

Furthermore, the multiple connectors may be easily pre-installed on the frame before fixing the frame to the truss of the passenger conveyor. Then, upon successively inserting each of the cover plates at its intended position on the frame, one or more of the pre-installed connectors may be moved longitudinally along the guide rail to an intended fixation location associated to the respective cover plate and may then be brought into the desired form-fitting engagement with the cover plate. Therein, both the longitudinal motion of the connectors as well as their bringing into form-fitting engagement may be easily accomplished, preferably without requiring any tools or at least no specific complicated tools. Preferably, all but the last cover plate may be fixed to the frame via the form-fitting connectors. As a final installing step, the last cover plate may be fixed to the frame in any of a variety of manners. For example, the last cover plate could be screwed to the frame. Overall, the cover plates may be easily installed and fixed by maintenance staff.

Furthermore, for example for maintenance purposes, some or all of the cover plates of the floor cover arrangement may easily be removed or dissembled. For such purposes, for example the last cover plate may be released from the frame, for example by releasing its screws. After this last cover plate is released, each one of the preceding cover plates may be easily released from the frame e.g., by simply moving its associated connector in the longitudinal direction away from the associated cover plate, thereby releasing the form-fitting fixation between the cover plate and the frame. This can be accomplished easily and preferably without tools.

According to an embodiment, the cover plates and the connectors may be configured such that each one of the connectors may be arranged at exactly one fixation location associated to one of the cover plates such as to cooperate with the associated cover plate in a form-fitting manner such that the cover plate is fixed in a direction orthogonal to the walking surface, whereas a connector not being arranged at a fixation location interferes with at least one of the cover plates such that this cover plate may not be installed correctly.

In other words, the number of cover plates and their geometry as well as the number of connectors and their geometry are preferably specifically selected such that there is exactly one single configuration in which each of the connectors is exactly associated to one of the cover plates and is arranged at one specific fixation location. Only in this specific configuration, the cover plates and connectors may be arranged such that the cover plates are installed in their correct installation position and are correctly fixed in their vertical direction being orthogonal to the walking surface. In all other configurations where either the cover plates are not correctly installed at their designated positions or the connectors are not correctly arranged at their intended fixation locations will result in a situation in which the non-correctly arranged components interfere with one another.

In such interfering situation, the cover plates may not be correctly installed and, for example, may not be arranged evenly, flush with their adjoining bottom and/or without gaps between neighbouring cover plates. For example, if not correctly arranged, one of the connectors which is not at its intended fixation location may protrude from the frame into a location where one of the cover plates should be such that this cover plate may not be correctly inserted to its intended destination position.

Due to such specific adaption of the cover plates and the connectors, a risk of misarranging these components and therefore a risk of incorrect installation of the floor cover arrangement may be minimized. For example, upon maintaining the floor cover arrangement, maintenance staff may temporarily open the floor cover arrangement by displacing one or several of its cover plates. However, after completing the maintenance procedure, all cover plates and connectors have to be rearranged again at its proper locations as, otherwise, the cover plates could not be correctly installed such as to form a continuous, even and/or flush walking surface.

According to an embodiment, the number of connectors may be equal to $m*(n-1)$, wherein m is the number of frame rails and n is the number of cover plates.

In other words, it may be beneficial to set the number of connectors equal to the number of frame rails at the frame times the number of cover plates of the floor cover arrangement minus 1. Accordingly, each one of the cover plates except for one cover plate may be fixed to each one of the frame rails by exactly one connector.

For example, assuming that there are $m=2$ frame rails and $n=4$ cover plates, $2*(4-1)=6$ connectors are to be provided such that the first three cover plates may each be fixed to both of the frame rails. The last cover plate may then be fixed to the frame without associated connectors but for example with a screw connection.

Accordingly, for a floor cover arrangement comprising a predetermined number of cover plates, a suitable number of connectors may be pre-installed to the frame. Then, upon initially installing the floor cover arrangement or upon for example re-closing the floor cover arrangement after temporarily opening it for maintenance purposes, there is no risk for installation errors such as for example some of the cover plates not being correctly fixed to the frame as each of the cover plates may be fixed to the frame only by its specific associated connector(s). In case, for example, that one cover plate is not correctly fixed by its connector(s) being arranged at respective fixation locations, those connector(s) will later in the installation procedure remain unused and would therefore have to be arranged at locations not being any intended fixation locations. Therefore, these remaining connectors would interfere with at least one of the cover plates thereby hindering correct installation of this cover plate. This would be remarked by the maintenance staff and the mis-arrangement of the connectors could therefore be corrected.

According to an embodiment, each connector comprises a first engagement portion for cooperating with one frame rail in a form-fitting manner such that the connector is displaceable in the longitudinal direction and is fixed in both directions orthogonal to the longitudinal direction, and a second engagement portion for cooperating with the associated cover plate in a form-fitting manner such that the cover plate is fixed in a direction orthogonal to the walking surface.

In other words, each connector may comprise two engagement portions. One engagement portion is configured for form-fitting engagement with the frame rail leaving only one motion degree of freedom in the longitudinal direction. For example, this first engagement portion may enclose a portion of the frame rail such that it may only be displaced longitudinally along the frame rail but not transverse thereto. Alternatively, the first engagement portion may be included or guided in a hollow frame rail. The second engagement portion may for example grip behind a portion of the cover plate such that the second engagement portion holds or even presses the cover plate in the downward direction.

For example, according to an embodiment, the second engagement portion may comprise a cantilever end being directed into the longitudinal direction.

In other words, the connector may comprise one end for example extending away from the first engagement portion in a cantilever manner and forming the second engagement portion. Therein, this cantilever end may be directed into the longitudinal direction such that it may engage or grip behind a horizontal recess in a front face of the cover plate. Thereby, using its cantilever end as the second engagement portion, the connector may fix the cover plate in the direction orthogonal to the walking surface.

In accordance with a specific embodiment thereof, each cover plate may comprise a recess in a front surface opposing a rear surface of a neighbouring one of the cover plates, wherein the second engagement portion of the connector is adapted for engaging into this recess.

Expressed differently, each cover plate may comprise a front surface and a rear surface wherein, when installed sequentially next to each other, the front surface of one cover plate opposes the rear surface of the neighbouring cover plate. In such configuration, a connector may be interposed into a small gap between neighbouring cover plates and may engage with its second engagement portion into the specifically provided recess in the front surface of one of the cover plates. Such recess may extend horizontally and may be for example some millimetres deep. Accordingly, upon installing the floor cover arrangement, the connector may be moved towards the front surface of one cover plate being inserted into the frame in a preceding installation step and may engage with its second engagement portion into the recess provided at this front surface. Accordingly, the engaging cantilever end of the second engagement portion may fix and hold down the associated cover plate at its front surface.

According to an embodiment, the associated cover plate and the neighbouring cover plate hinder the connector from moving along both of opposite longitudinal directions along the frame rail in cases when the connector is arranged at its fixation location associated to the associated cover plate and is interposed between the associated cover plate and the neighbouring cover plate. Finally, the connector is completely immovable trapped or only movable within a very limited space so that the second engagement portion rests sufficiently secure in the associated recess of the associated cover plate.

In other words, each of the fixation locations may be selected or arranged such that when a connector is arranged at such fixation location, it is interposed between its associated cover plate (e.g., the cover plate being fixed by this connector through form-fitting engagement) and the neighbouring cover plate. In such situation, the neighbouring two cover plates hinder the interposed connector from moving in the longitudinal directions and therefore preventing the second engagement portion to move out of the recess of the associated cover plate.

In the installation procedure, one of the cover plates is first arranged at its intended location. Then, the associated connector is moved longitudinally towards this inserted cover plate until it reaches its fixation location and engages with its second engagement portion with the associated cover plate. Then, the neighbouring cover plate is inserted into the frame thereby for example enclosing the interposed connector between the neighbouring two cover plates. Accordingly, this connector may not be moved longitudinally any more unless the neighbouring cover plate is again removed for example during uninstalling the floor cover arrangement for maintenance purposes.

According to an embodiment, the frame rail may be provided with a releasable stopper member for limiting a displacement range of the connectors along the frame rail.

Expressed differently, while each of the connectors should be displaceable in the longitudinal direction along the frame rail, it should be avoided that connectors are for example lost upon slipping-off one end of the frame rail. Therefore, the stopper member may limit the displacement range of the connectors in the longitudinal motion direction.

Such stopper member may be for example a releasable screw provided at or close to an end of the frame rail. Such screw may be attached to the frame rail for example after pre-installing all of the connectors to the frame rail and may then avoid that any connectors are unintendedly drawn away or fall-off from the frame rail in the longitudinal direction.

According to an embodiment, each connector comprises a predetermined breaking point at which the connector breaks and releases the fixation of the associated cover plate to the frame upon a force exceeding a predetermined limit being applied to the cover plate.

In other words, provisions may be made for limiting a physical strength of the connector at least in portions thereof. A predetermined breaking point provided by such weakening may help the connector break in case strong forces are applied to the connector, particularly if such forces are exerted in a specific direction. For example, the predetermined breaking point may be configured such that the connector releases the fixation of a cover plate in case a force exceeding a predetermined limit is exerted onto the cover plate in an upward direction. The predetermined limit may be set for example to 200N. Such provision of a predetermined breaking point may render account of certain regulations such as for example the European norm EN115 ruling that "If rooms behind inspection covers and floor plates can be entered, it shall be possible to open them from the inside without a key or a tool even when locked."

According to an embodiment, each connector may be an integral component.

In other words, the connectors may be provided as single piece components. Accordingly, for example the first and second engagement portions may be provided at one single component. Such integral component may be easily manufactured, handled and/or installed.

According to an embodiment, each connector may be formed by a cut and bent metal sheet, a plastic component and/or a bent wire.

Accordingly, a connector may be made from a metal sheet which is cut and bent into a suitable configuration. For example, such metal sheet may be cut and bent such as to form a first engagement portion for engaging with the frame rail and a second engagement portion for engaging with the associated cover plate. The metal sheet may be made with a metal providing sufficient strength, such as steel. The metal sheet may be provided with a sufficient sheet thickness of for example more than 1 mm, preferably more than 2 mm or more than 3 mm or 5 mm, such as to provide for a sufficient mechanical strength for fixing the associated cover plate to the guide rail.

Alternatively or additionally, the connector may be provided as a plastic component. Such plastic component may be manufactured for example using injection moulding or casting techniques. The plastic connector may be made from any suitable plastic material such as for example thermoplastic materials (e.g., polyethylene (PE) or polyvinylchloride (PVC)) or duroplastic material, e.g., epoxy resin. Plastic connectors may be cheap and/or light.

As a further alternative, the connectors may be made with a bent wire, preferably with a bent spring wire. For example, a wire having a certain diameter or cross-section may be bent into a desired configuration such as to form for example the first and second engagement portions of the connector. Such connectors made from bent wires may be produced at low costs and/or may easily be configured into a geometry in which they may cooperate with the guide rail and/or the associated cover plate in a desired manner.

According to an embodiment, the floor cover arrangement may further comprise a screw arrangement with which one of the cover plates may be screwed to the frame.

In other words, while most of the cover plates shall be fixed to the frame via the specific connectors, at least one of the floor cover arrangement's cover plates, such as for example the last cover plate in a sequence of cover plates, may be fixed to the frame not by one of the connectors but by a specific screw arrangement. Therein, screws may be used for reliably fixing this one cover plate to the frame.

While the connectors are generally provided underneath each of the cover plates and, upon installing the floor cover arrangement, are moved along the frame rails of the frame also being arranged underneath the multiplicity of cover plates, the screw arrangement may be accessible from an upper side of the floor cover arrangement. Accordingly, in an installation procedure, all but the last cover plate may be fixed to the frame by suitably moving and arranging the associated connectors underneath these cover plates before, as a last installation step, fixing the last cover plate to the frame using the specific screw arrangement. Thus, as each cover plate and its associated connector is generally held in position by its neighbouring cover plate and the last cover plate is fixed to the frame by its screw arrangement, the entirety of all cover plates is fixedly installed at the frame.

It shall be noted that possible features and advantages of embodiments of the disclosure are described herein partly with respect to a floor cover arrangement, partly with respect to a passenger conveyor comprising such floor cover arrangement and partly with respect to a method for installing such floor cover arrangement. One skilled in the art will recognize that the features may be suitably transferred from one embodiment to another and features may be modified, adapted, combined and/or replaced, etc. in order to come to further embodiments of the disclosure.

BRIEF DESCRIPTION OF THE DRAWINGS

In the following, advantageous embodiments of the disclosure will be described with reference to the enclosed drawings. However, neither the drawings nor the description shall be interpreted as limiting the disclosure.

The figures are only schematic and not to scale. Same reference signs refer to same or similar features throughout the figures.

DETAILED DESCRIPTION

Figure 1:
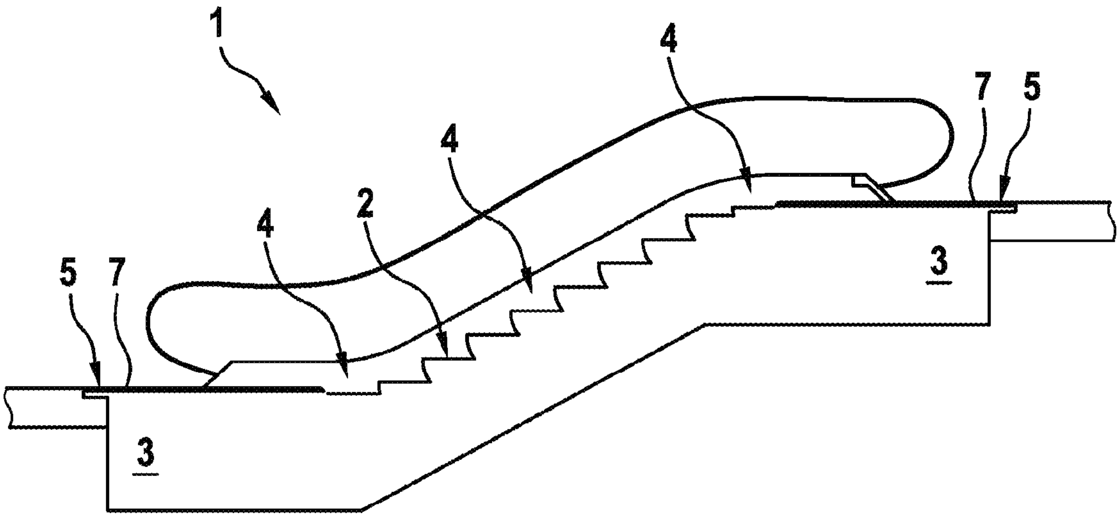
FIG. 1 shows a passenger conveyor.

FIG. 1 shows a passenger conveyor 1 represented by an escalator. A transfer unit 2 may transport passengers along a transfer path 4. Underfloor spaces 3 are provided at both an upper end and a lower end of the escalator. The underfloor spaces 3 accommodate for example a drive unit, a control unit, etc. (not shown). Each underfloor space 3 is covered by a floor cover arrangement 5, such that passengers may walk over a walking surface 7 formed by this floor cover arrangement 5 in order to enter or leave the passenger conveyor 1.

Figure 2:
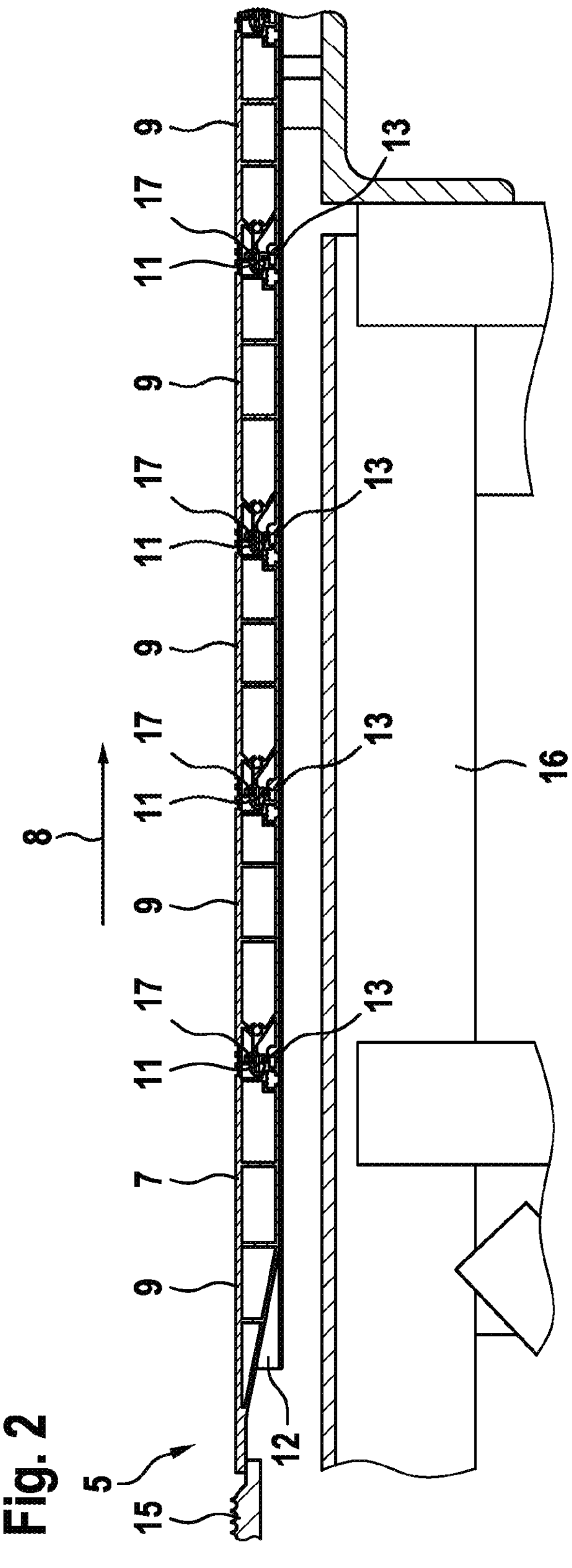
FIG. 2 shows a cross section through a floor cover arrangement of a passenger conveyor.

FIG. 2 shows an enlarged sectional view through a floor cover arrangement 5. The floor cover arrangement 5 is composed of several cover plates 9. The cover plates 9 are arranged in a common plane in a sequence along a longitudinal direction 8 such that front surfaces 11 and rear surfaces 13 of neighbouring cover plates 9 oppose each other. Neighbouring cover plates 9 are mechanically connected to each other at their front and rear surfaces 11, 13 via joints 17. A comb plate 15 is provided at a front end of the floor cover arrangement 5. All cover plates 9 are supported by a frame 12. The frame 12 is supported by a truss 16 of the escalator.

Figure 3:
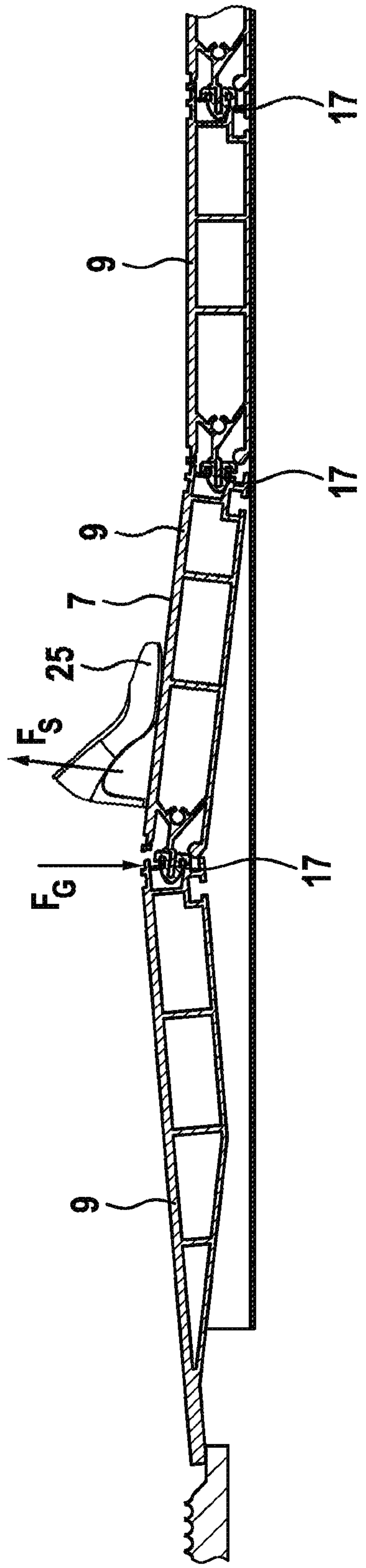
FIG. 3 visualizes an unintended lifting of a cover plate of a floor cover arrangement.

FIG. 3 visualizes an example of how a shoe 25 may be caught for example with its heel in grooves at the walking surface 7 of a cover plate 9. The wearer of the shoe 25 may then exert a force $F_S$ onto this cover plate 9 and may therefore temporarily lift this cover plate 9. Conventionally, such upward-directed force $F_S$ is only counter-acted by a gravity force $F_G$.

Figure 4:
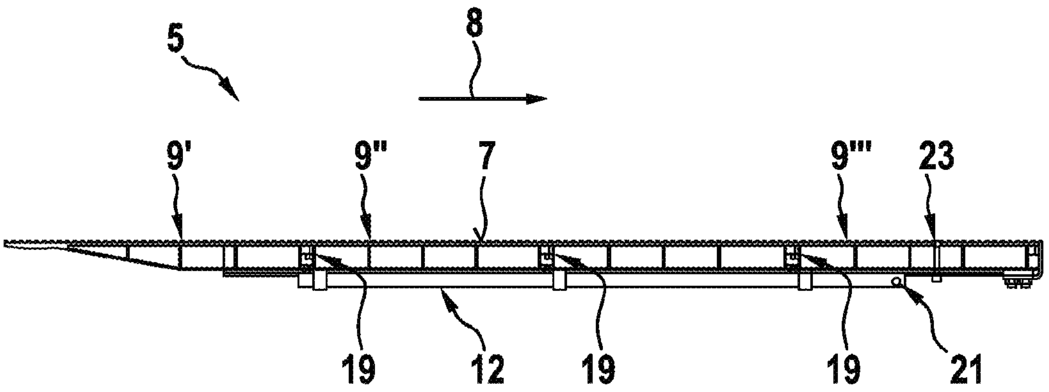
FIG. 4 shows a longitudinal section through a floor cover arrangement according to an embodiment.

FIG. 4 shows a longitudinal section through a floor cover arrangement 5 according to the disclosure. The floor cover arrangement 5 comprises a first cover plate 9', a middle cover plate 9'' and a last cover plate 9''' arranged such as to adjoin to each other in a sequence along the longitudinal direction 8. Each of the cover plates 9', 9'', 9''' is fixed to a frame 12 via associated connectors 19. Therein, each connector 19, on the one hand, cooperates with a frame rail 27

(see FIGS. 5 and 7) provided at the frame 12 in a form-fitting manner such that that the connector 19 may only be displaced in the longitudinal direction 8 but is fixed in both directions orthogonal to this longitudinal direction 8. On the one hand, upon correct installation, each connector 19 is arranged at a specific fixation location along the length of the frame 12 and is associated to one of the cover plates 9', 9", 9'''. In such configuration, each connector 19 cooperates with the associated cover plate 9', 9", 9''' in a form-fitting manner such that the cover plate 9', 9", 9''' is fixed in a direction orthogonal to the walking surface 7. At least at one end, the frame 12 comprises a stopper member 21 such as a screw fixed to the frame in order to avoid that any connectors 19 slip-off from the frame 12 when the cover plates 9', 9", 9''' are removed. Furthermore, in the floor cover arrangement 5, the last cover plate 9''' is fixed to the frame 12 by a screw arrangement 23.

Figure 5:
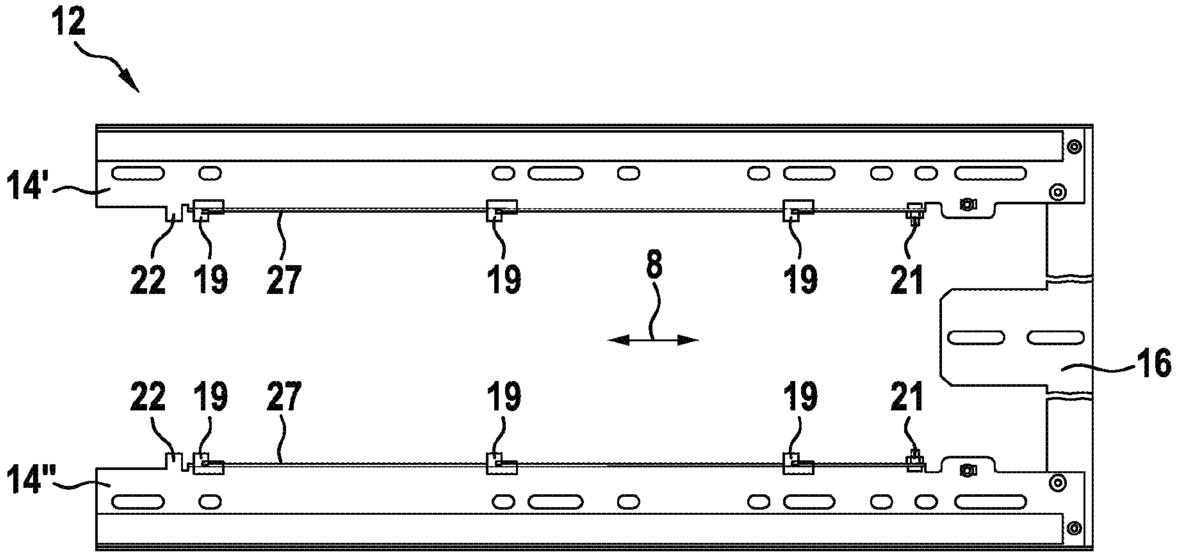
FIG. 5 shows a top view onto a frame of a floor cover arrangement according to an embodiment.

FIG. 5 shows a top view onto a frame 12 of an inventive floor cover arrangement 5. The frame 12 comprises two elongate side panels 14', 14". The side panels 14', 14" are arranged parallel to each other and spaced to each other and are connected at one end via a centre piece 16. At inner edges, both of the side panels 14', 14" comprise a flange which serves as a frame rail 27. The side panels 14', 14" may be made from metal sheets and the frame rails 27 may be formed by suitable bending of edges of such metal sheets. The connectors 19 may engage with the frame rails 27 in a form-fitting manner such that they may be displaced in the longitudinal direction 8 along the frame rails 27. A screw attached to the frame rails 27 serves as a rear side stopper member 21. A front side stopper member 22 may be formed by a protruding portion of the side panels 14', 14" and may, in contrast to the rear side stopper member 21, not be releasable.

Figure 6:
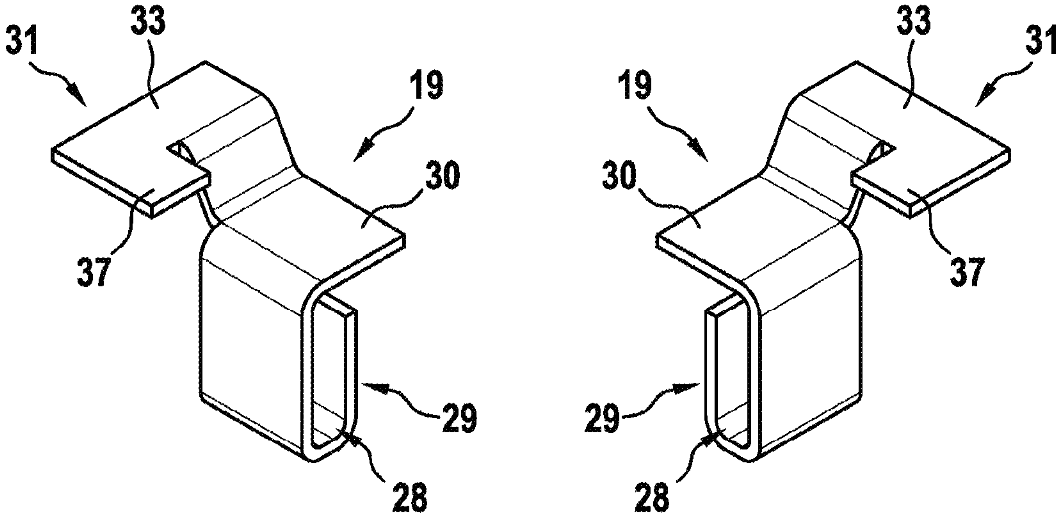
FIGS. 6(*a*) and (*b*) show perspective views on a left-side and a right-side connector of a floor cover arrangement according to an embodiment.
Figure 7:
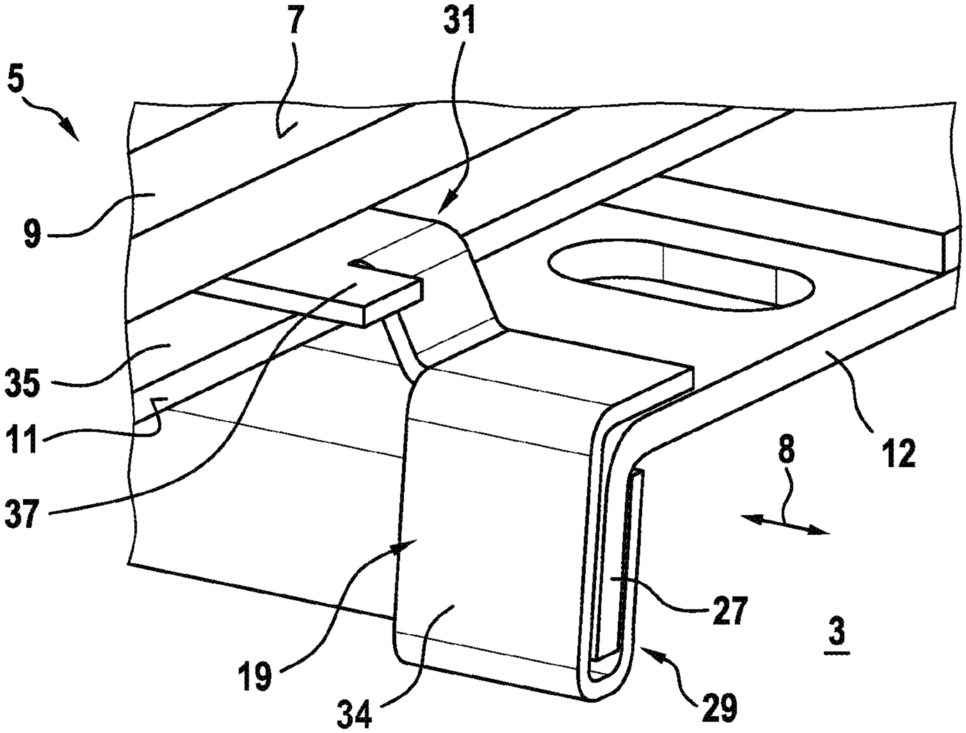
FIG. 7 shows a perspective partial view through a floor cover arrangement according to an embodiment.

FIGS. 6(*a*) and (*b*) show perspective views onto exemplary connectors 19. FIG. 7 shows a perspective view onto a portion of a floor cover arrangement 5 in which the connector 19 engages with a cover plate 9 and with the frame rail 27 of the frame 12. In this example, the connector 19 is formed by a cut and bent metal sheet 34.

The connector 19 comprises a first engagement portion 29 with which it may cooperate with the frame rail 27 in a form-fitting manner by embracing the flange forming the frame rail 27 from opposing sides thereof. Specifically, this first engagement portion is provided with a U-shaped lower section 28 and a top section 30 extending perpendicular thereto.

The connector 19 further comprises a second engagement portion 31 with which it may cooperate with an associated cover plate 9 in a form-fitting manner such that the cover plate is fixed in a direction orthogonal to the walking surface 7. Particularly, the connector 19 is provided with a cantilever end 33 forming its second engagement portion 31 and being directed in the longitudinal direction 8 towards a recess 35 provided in the front surface 11 of the cover plate 9.

Furthermore, the connector 19 comprises a protruding end 37 protruding from the cantilever end 33 in an opposite direction, e.g., away from the recess 35. Accordingly, the protruding end 37 extends out of the recess 35 and may be used for example for limiting the play in an assembled state, e.g. the protruding end 37 adjoin the following cover plate 9 in a close manner and prevents disengaging of the cantilever end 33 from the cover plates 9 recess 33.

With respect to FIGS. 8 to 11, an alternative embodiment of an inventive floor cover arrangement 5 will be described.

Figure 8:
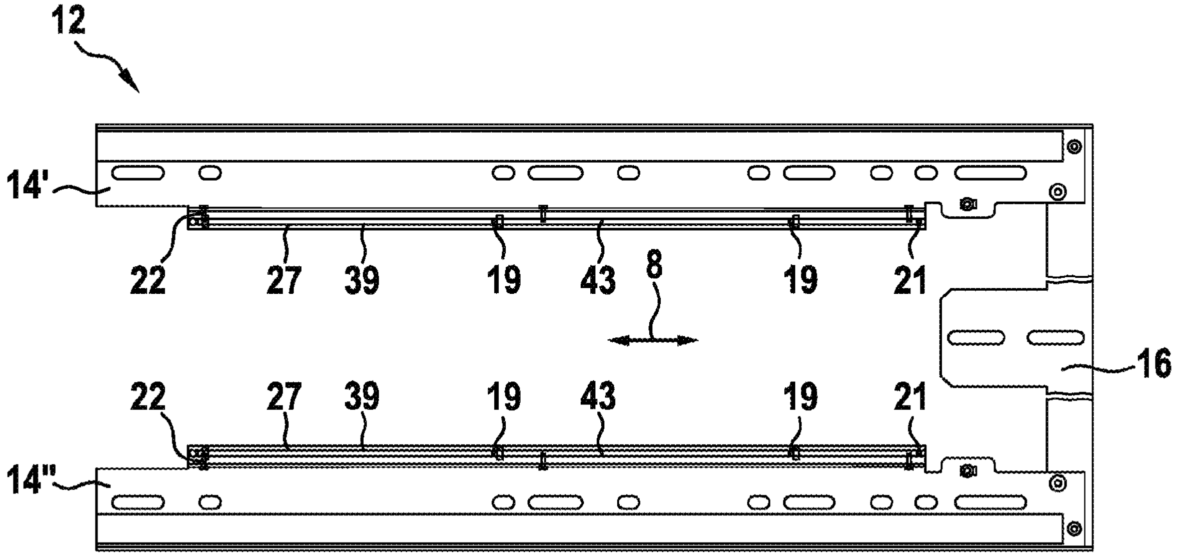
FIG. 8 shows a top view onto a frame of a floor cover arrangement according to another embodiment.

FIG. 8 shows a frame 12 having a similar design as the frame 12 of FIG. 5. However, in this example, the frame rail 27 is not a simple flange protruding from the metal sheet forming the rest of the frame 12. Instead, the frame rails 27 are formed with aluminium profiles 39. These elongate profiles 39 enclose an inner volume 41 and have a longitudinal slit 43 at their top side. Each profile 39 may be attached to one of the side panels 14', 14" at an inner edge thereof.

Figure 9:
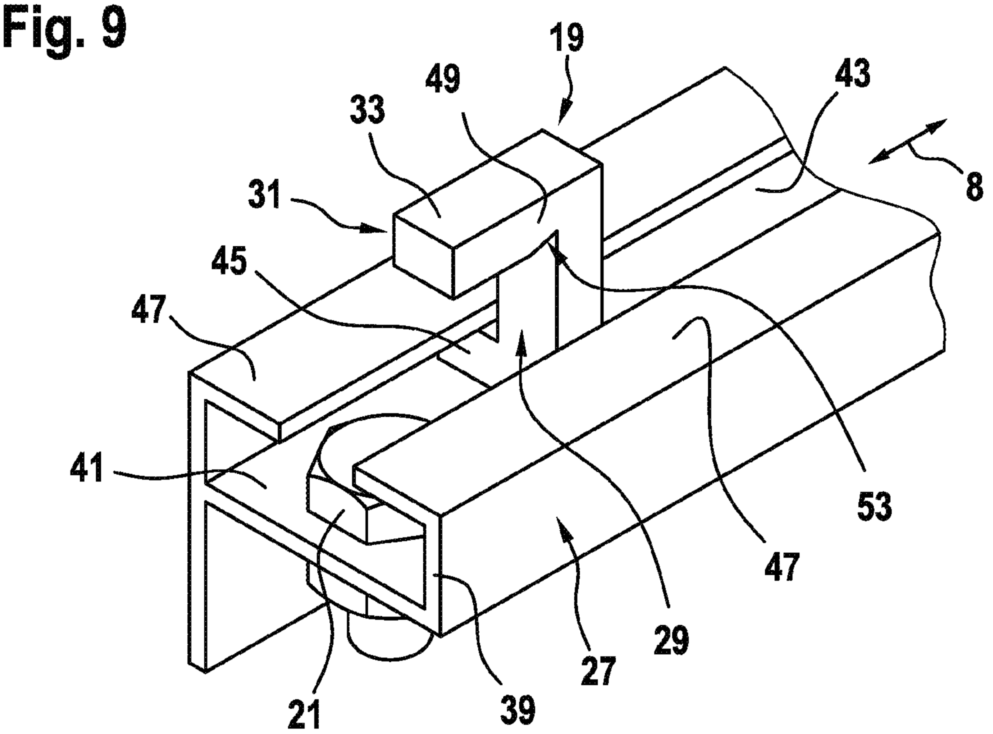
FIG. 9 shows a perspective view of a connector engaged in a frame rail of a floor cover arrangement according to an embodiment.
Figure 10:
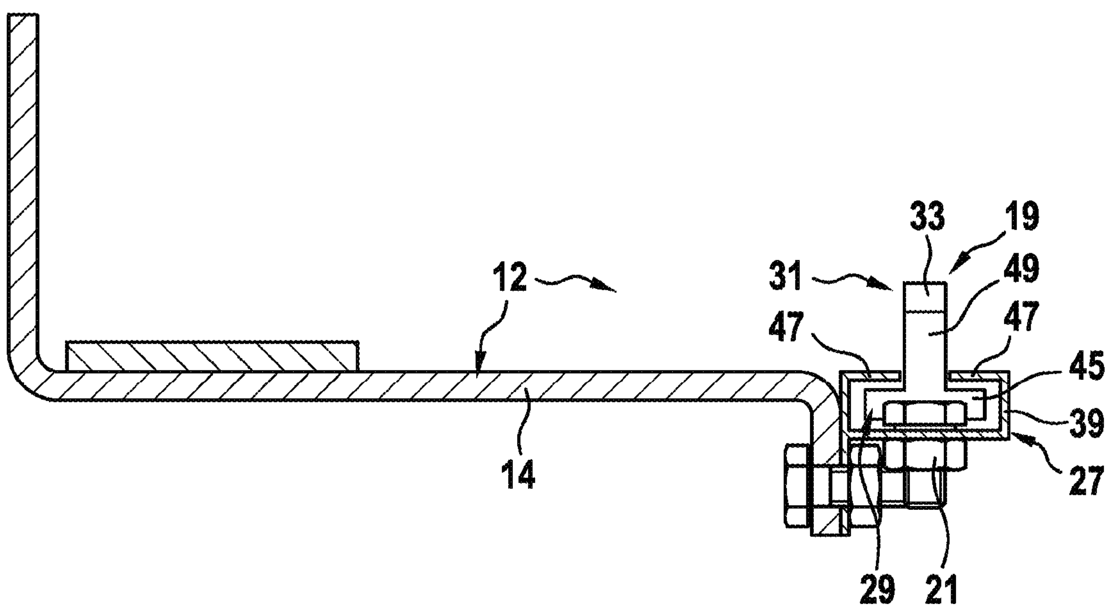
FIG. 10 shows a front view of the configuration of FIG. 9.

As can be seen in more detail in FIGS. 9 and 10, a T-shaped lower portion 45 of a connector 19 is engaged in the inner volume 41 of the profile 39 of the frame rails 27. The lower portion 45 of the connector 19 is covered by horizontal portions 47 of the profile 39 such that, while being displaceable along the longitudinal direction 8 parallel to the slit 43 in the profile 39, the connector 19 may not be displaced in an upward direction orthogonal thereto. An upper portion 49 of the connector 19 protrudes through the slit 43. This upper portion 49 has an L-shape and comprises a cantilever end 33 directed in the longitudinal direction 8.

The connector 19 may be made with a plastic material. Such plastic connector can easily slide within the aluminium frame rail 27 and can be produced at low costs e.g. by moulding techniques.

Furthermore, the connector 19 may have a section with a reduced material thickness forming a predetermined breaking point 53. At such section, the connector 19 may break e.g. upon excessive upward forces acting thereon, thereby eventually releasing a previously fixed cover plate 9.

Figure 11:
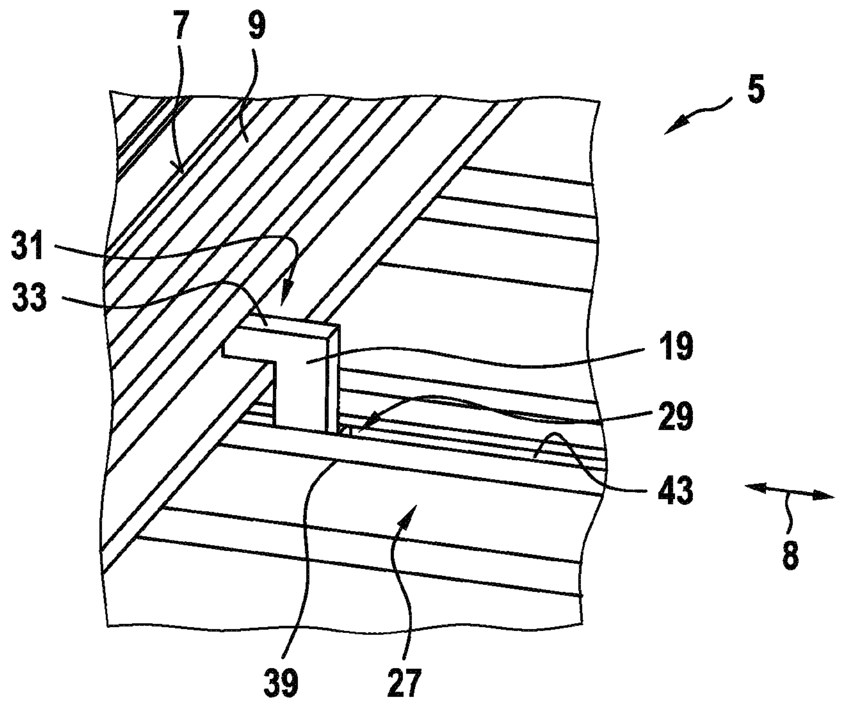
FIG. 11 shows a perspective side view of the configuration of FIG. 9.

As can be seen in FIG. 11, the connector 19 may slide in the longitudinal direction 8 along the frame rail 27 towards a cover plate 9 until its cantilever end 33 slips over one edge of the associated cover plate 9 thereby preventing that the cover plate 9 may be lifted in an upward direction. Accordingly, in this example, the lower portion 45 comprised in the profile 39 of the guide rail 27 forms the first engagement portion 29 of the connector 19 for form-fitting engagement with the frame rail 27. The upper portion 49 forms the second engagement portion 31 for form-fitting engagement with the cover plate 9, thereby keeping the cover plate 9 down even in cases where upward forces $F_S$ act on the cover plate 9.

Figure 12:
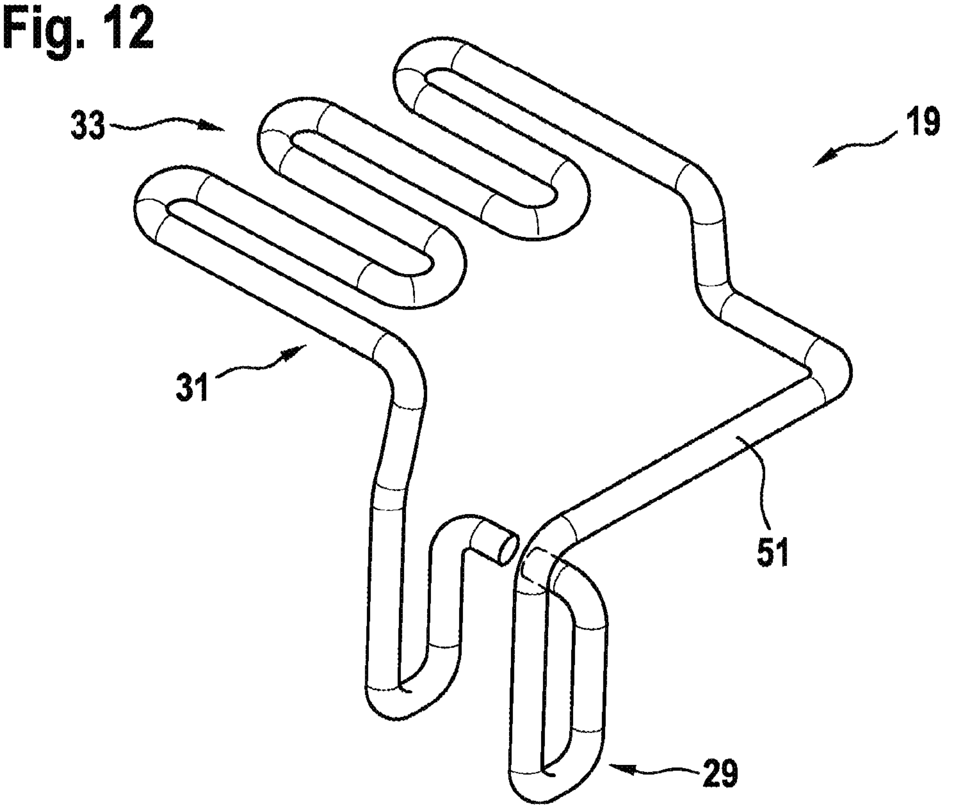
FIG. 12 shows a connector made from a bent wire for a floor cover arrangement according to another embodiment.
Figure 13:
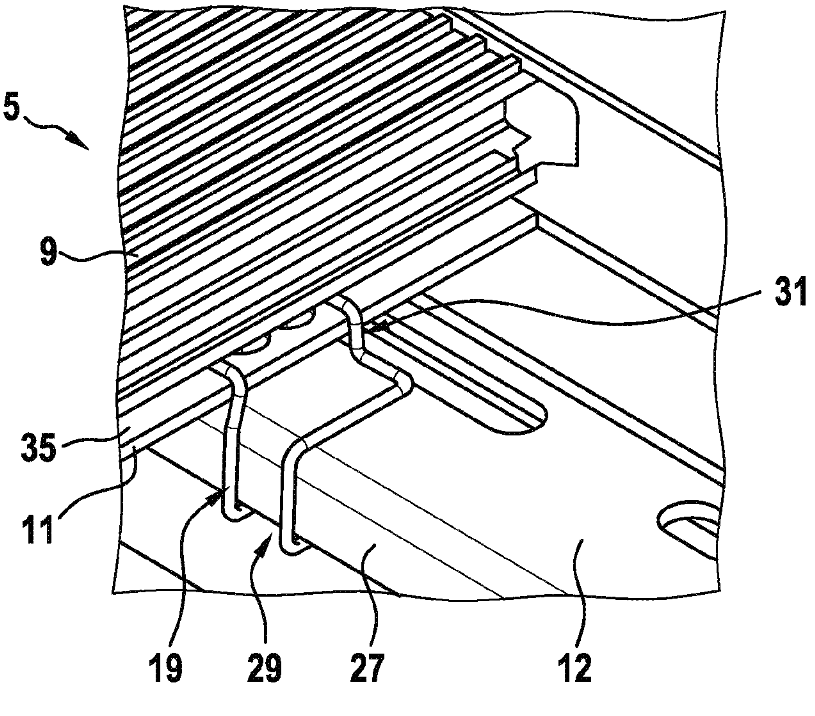
FIG. 13 shows a perspective view with the bent wire of FIG. 12 fixing a cover plate in a floor cover arrangement according to an embodiment.

FIGS. 12 and 13 show another example of a connector 19 and its function in a floor cover arrangement 5. In this case, the connector 19 is made by a spring wire 51, which can be easily bent and formed into a desired configuration. A lower portion forming a first engagement portion 29 of the connector 19 is bent such as to form a U-shaped hook which engages with a flange of the frame 12 forming a frame rail 27. An upper portion forming a second engagement portion 31 of the connector 19 extends with a cantilever end 33 into a recess 35 at the front surface 11 of the cover plate 9.

Normally, the hook-shaped first engagement portion 29 may tightly contact the frame rail 27 at the frame 12 and enclose it with its lower U-shaped portion. However, as the spring wire has a certain flexibility, the hook end may be opened a little, if necessary, such that the connector 19 may be separated from the frame and be removed. Thereby, the connector 19 may be "opened" such that the engaged cover plate 9 may be released and may be easily opened for example in a case where a maintenance staff is caught inside the underfloor space 3. Alternatively to such emergency opening option, the connector 19 may comprise a predetermined breaking point 53 such as indicated in FIG. 9 by a narrowed location at the upper portion 49 of the connector 19.

Figure 14:
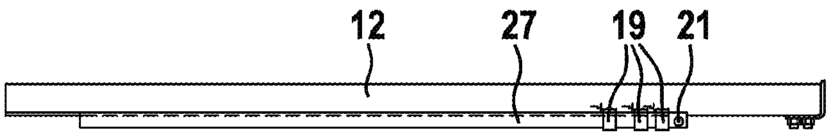
FIG. 14 visualizes process steps during installing a floor cover arrangement according to an embodiment.
Figure 14:
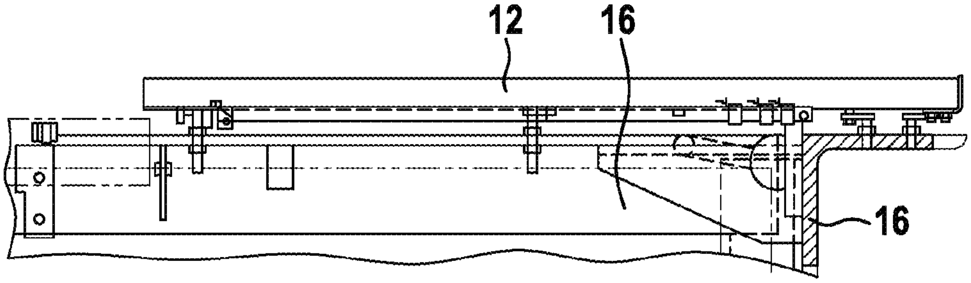
Figure 14:
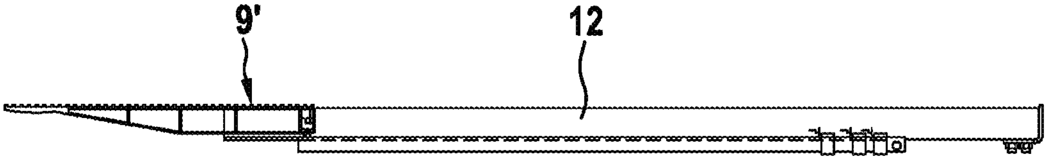
Figure 14:
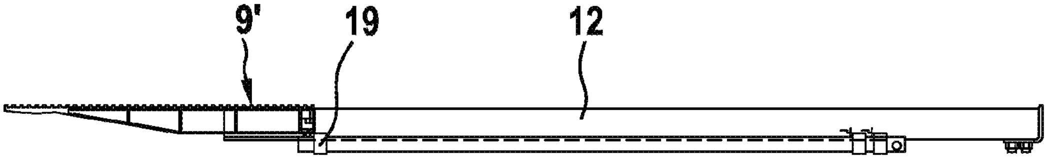
Figure 14:
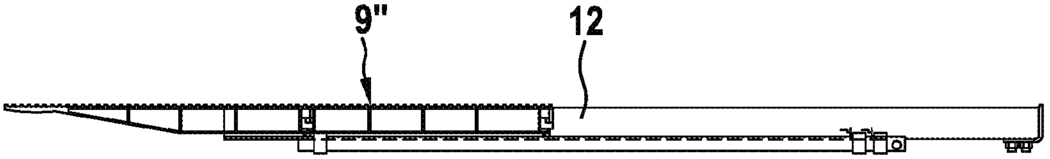
Figure 14:
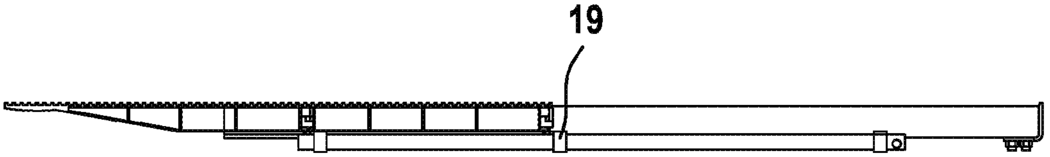
Figure 14:
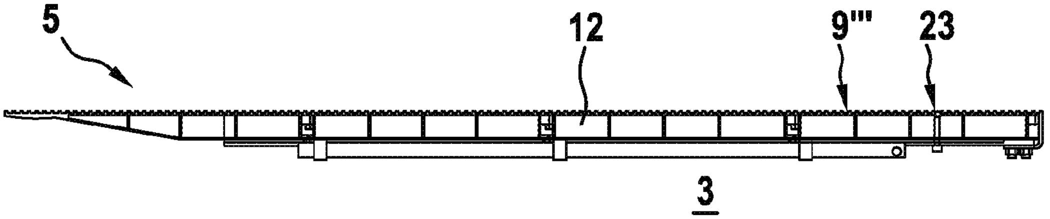

Finally, processing steps in a method for installing a floor cover arrangement 5 according to an embodiment shall be briefly described with reference to FIG. 14.

First, a predetermined number of connectors 19 is pre-installed on the frame rails 27 of the frame 12. Each frame rail 27 preferably receives a number x of connectors 19 corresponding to the number n of intended cover plates 9 minus 1, i.e. x=(n−1). An overall number of connectors 19 of the floor cover arrangement 5 the x*m, wherein m is the number of frame rails 27. After the connectors 19 are pre-installed, the stopper member 21 is fixed at an end of the guide rail 27. (Step (a).)

Next, the frame 12 is installed on a truss 16 (only schematically illustrated) of the passenger conveyor. (Step (b).)

Then, the first cover plate 9' is inserted into the frame 12. The cover plate 9' may be laid onto or into the frame 12. (Step (c).)

Next, a first one of the connectors 19 previously located at an opposite end of the frame rail 27 is moved longitudinally towards the first cover plate 9' until it reaches a fixation location associated to this first cover plate 9'. Upon arranging this connector 19 at its fixation location, its second engagement portion engages with the first cover plate 9' and thereby prevents the first cover plate 9' from being lifted in an upward direction. Typically, connectors 19 at both frame rails 27 are moved to their fixation locations thereby fixing the cover plate 9' at both lateral sides. (Step (d).)

Next, the second cover plate 9" is inserted into the frame 12. (Step (e).)

This second cover plate 9" is then fixedly connected to the frame 12 by moving an associated one of the connectors 19 longitudinally towards this cover plate 9" until it engages at its fixation location with the cover plate 9". (Step (f).)

This procedure of inserting a next cover plate 9 and then fixing it by one or more associated ones of the connectors 19 is repeated until all but the last cover plate 9''' is to be inserted into the frame 12. At such final stage, all of the initially pre-installed connectors 19 are correctly installed at their fixation locations. If this is not the case, installation staff will recognize a remaining connector 19, as this connector 19 may block at least one of the cover plates 9 from being correctly installed, as it will protrude into the space where the cover plates 9 should be inserted into the frame 12.

The last cover plate 9''' is finally inserted into the frame 12 and is fixed to the frame 12 using the screw arrangement 23 which is accessible from outside the underfloor space 3.

In order to temporarily open the floor cover arrangement 5, the procedure described with reference to FIG. 14 may be reversed. In other words, first the screw arrangement 23 may be opened and the last cover plate 9" may be removed by simple lifting it out of the frame 12. Then, the connectors 19 are accessible from outside the underfloor space 3 and may be drawn away from their associated cover plates 9 such that, step by step, each of the cover plates 9 may be easily released and removed.

Finally, it should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. A floor cover arrangement for covering an underfloor space of a passenger conveyor, the floor cover arrangement comprising:

a plurality of cover plates configured to be installed such that the plurality of cover plates adjoin each other in a sequence along a longitudinal direction of the underfloor space and the plurality of cover plates form a walking surface covering the underfloor space;

a frame comprising at least one frame rail extending underneath the plurality of cover plates in the longitudinal direction; and a plurality of connectors, each connector being configured for fixedly connecting one of the plurality of cover plates with the frame;

wherein the plurality of cover plates, the frame and the plurality of connectors are configured such that each connector cooperates with the at least one frame rail in a form-fitting manner such that the connector is displaceable in the longitudinal direction and is fixed in two directions orthogonal to the longitudinal direction, and each connector, when arranged at a fixation location associated with one of the plurality of cover plates, cooperates with the associated cover plate in a form-fitting manner such that the cover plate is fixed in a direction orthogonal to the walking surface.

2. The floor cover arrangement of claim 1, wherein the plurality of cover plates and the plurality of connectors are configured such that each one of the plurality of connectors may be arranged at one fixation location associated to one of the plurality of cover plates such as to cooperate with the associated cover plate in a form-fitting manner such that the cover plate is fixed in a direction orthogonal to the walking surface, and wherein a connector not being arranged at a fixation location interferes with at least one of the cover plates such that this cover plate may not be installed correctly.

3. The floor cover arrangement of claim 1, wherein the number of connectors is equal to m*(n−1), m being the number of frame rails and n being the number of cover plates.

4. The floor cover arrangement of claim 1, wherein each connector comprises:

a first engagement portion for cooperating with the at least one frame rail in a form-fitting manner such that the connector is displaceable in the longitudinal direction and is fixed in two directions orthogonal to the longitudinal direction; and a second engagement portion for cooperating with the associated cover plate in a form-fitting manner such that the cover plate is fixed in a direction orthogonal to the walking surface.

5. The floor cover arrangement of claim 4, wherein the second engagement portion comprises a cantilever end extending in the longitudinal direction.

6. The floor cover arrangement of claim 4, wherein each cover plate comprises a recess in a front surface opposing a rear surface of a neighbouring one of the cover plates and wherein the second engagement portion of the connector is adapted for engaging the recess.

7. The floor cover arrangement of claim 1, wherein, when arranged at the fixation location associated with one of the cover plates and being interposed between the associated cover plate and a neighbouring cover plate, the associated cover plate and the neighbouring cover plate hinder the connector from moving along in both of opposite longitudinal directions along the frame rail.

8. The floor cover arrangement of claim 1, wherein the frame rail is provided with a releasable stopper member for limiting a displacement range of the connectors along the frame rail.

9. The floor cover arrangement of claim 1, wherein each connector comprises a predetermined breaking point at which the connector breaks and releases the fixation of the cover plate to the frame upon a force exceeding a predetermined limit being applied to the cover plate.

10. The floor cover arrangement of claim 1, wherein each connector is an integral component.

11. The floor cover arrangement of claim 1, wherein each connector is formed by at least one of a cut and bent metal sheet, a plastic component and a bent wire.

12. The floor cover arrangement of claim 1, further comprising a screw arrangement for screwing one of the cover plates to the frame.

13. The passenger conveyor comprising the floor cover arrangement claim 1.

14. A method of installing a floor cover arrangement comprising a plurality of cover plates configured to be installed such that the plurality of cover plates adjoin each other in a sequence along a longitudinal direction of the underfloor space and the plurality of cover plates form a walking surface covering the underfloor space, a frame comprising at least one frame rail extending underneath the plurality of cover plates in the longitudinal direction, and a plurality of connectors, each connector being configured for fixedly connecting one of the plurality of cover plates with the frame, wherein the plurality of cover plates, the frame and the plurality of connectors are configured such that each connector cooperates with the at least one frame rail in a form-fitting manner such that the connector is displaceable in the longitudinal direction and is fixed in two directions orthogonal to the longitudinal direction, and each connector, when arranged at a fixation location associated with one of the plurality of cover plates, cooperates with the associated cover plate in a form-fitting manner such that the cover plate is fixed in a direction orthogonal to the walking surface, the method comprising:

a) pre-installing all of the plurality of connectors on the frame;

b) installing the frame on a truss of a passenger conveyor;

c) inserting a first cover plate on the frame;

d) fixing the first cover plate to the frame by moving one of the pre-installed connectors longitudinally to a fixation location associated to the first cover plate and cooperatively engaging the connector with the first cover plate;

e) inserting a next cover plate on the frame adjoining to the preceding cover plate;

f) fixing the next cover plate to the frame by moving one of the pre-installed connectors longitudinally to a fixation location associated to the next cover plate and cooperatively engaging the connector with the next cover plate;

g) repeating steps e) and f) until all but a last cover plate are inserted and fixed;

h) inserting the last cover plate on the frame; and i) fixing the last cover plate to the frame.

15. The method of claim 13, wherein the last cover plate is screwed to the frame.

* * * * *